(12) United States Patent
Johnson et al.

(10) Patent No.: US 9,928,975 B1
(45) Date of Patent: Mar. 27, 2018

(54) THREE-WAY SWITCH

(71) Applicant: ICONTROL NETWORKS, INC., Redwood City, CA (US)

(72) Inventors: Jim Johnson, Austin, TX (US); Kenneth Egan, Austin, TX (US)

(73) Assignee: iControl Networks, Inc., Philadelphia, PA (US)

( * ) Notice: Subject to any disclaimer, the term of this patent is extended or adjusted under 35 U.S.C. 154(b) by 457 days.

(21) Appl. No.: 14/204,654

(22) Filed: Mar. 11, 2014

Related U.S. Application Data

(60) Provisional application No. 61/784,342, filed on Mar. 14, 2013.

(51) Int. Cl.
  *H01H 9/54* (2006.01)
  *H01H 89/00* (2006.01)
  *H02M 7/10* (2006.01)

(52) U.S. Cl.
  CPC .............. *H01H 9/54* (2013.01); *H01H 89/00* (2013.01); *H02M 7/10* (2013.01)

(58) Field of Classification Search
  CPC ............. H01H 9/00; H01H 9/54; H01H 89/00
  USPC .................................. 307/112–115, 125, 139
  See application file for complete search history.

(56) References Cited

U.S. PATENT DOCUMENTS

| | | |
|---|---|---|
| 686,838 A | 11/1901 | Richard |
| 4,141,006 A | 2/1979 | Braxton |
| 4,257,038 A | 3/1981 | Rounds et al. |
| 4,363,031 A | 12/1982 | Reinowitz |
| 4,520,503 A | 5/1985 | Kirst et al. |
| 4,559,526 A | 12/1985 | Tani et al. |
| 4,574,305 A | 3/1986 | Campbell et al. |
| 4,581,606 A | 4/1986 | Mallory |
| D284,084 S | 6/1986 | Ferrara, Jr. |
| 4,641,127 A | 2/1987 | Hogan et al. |
| 4,652,859 A | 3/1987 | Van Wienen |
| 4,694,282 A | 9/1987 | Tamura et al. |
| 4,730,184 A | 3/1988 | Bach |
| 4,754,261 A | 6/1988 | Marino |
| 4,779,007 A | 10/1988 | Schlanger et al. |
| 4,801,924 A | 1/1989 | Burgmann et al. |
| 4,812,820 A | 3/1989 | Chatwin |
| 4,833,339 A * | 5/1989 | Luchaco .............. H02M 5/257 307/115 |
| 4,833,449 A | 5/1989 | Gaffigan |

(Continued)

FOREIGN PATENT DOCUMENTS

| | | |
|---|---|---|
| AU | 2005223267 | 9/2005 |
| AU | 2005223267 B2 | 12/2010 |

(Continued)

OTHER PUBLICATIONS

Alarm.com—Interactive Security Systems, Elders [retrieved on Nov. 4, 2003], 1 page.

(Continued)

*Primary Examiner* — Levi Gannon
(74) *Attorney, Agent, or Firm* — Baker & Hostetler LLP

(57) ABSTRACT

Devices and methods comprise a relay coupled between conductors and rectifier circuits. A converter is coupled between the rectifier circuits and a radio frequency (RF) device. Control signals are coupled to the RF device. A physical switch is coupled to the RF device, and the control outputs of the physical switch form a multi-way switch.

20 Claims, 4 Drawing Sheets

(56) References Cited

U.S. PATENT DOCUMENTS

| | | |
|---|---|---|
| 4,855,713 A | 8/1989 | Brunius |
| 4,860,185 A | 8/1989 | Brewer et al. |
| 4,897,630 A | 1/1990 | Nykerk |
| 4,918,623 A | 4/1990 | Lockitt et al. |
| 4,951,029 A | 8/1990 | Severson |
| 4,959,713 A | 9/1990 | Morotomi et al. |
| 4,993,059 A | 2/1991 | Smith et al. |
| 4,994,787 A | 2/1991 | Kratt et al. |
| 5,023,901 A | 6/1991 | Sloan et al. |
| 5,086,385 A | 2/1992 | Launey et al. |
| 5,091,780 A | 2/1992 | Pomerleau |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| D337,569 S | 7/1993 | Kando |
| 5,227,776 A | 7/1993 | Starefoss |
| 5,237,305 A | 8/1993 | Ishikuro et al. |
| 5,319,394 A | 6/1994 | Dukek |
| 5,319,698 A | 6/1994 | Glidewell et al. |
| 5,334,974 A | 8/1994 | Simms et al. |
| 5,438,607 A | 8/1995 | Przygoda, Jr. et al. |
| 5,446,445 A | 8/1995 | Bloomfield et al. |
| 5,465,081 A | 11/1995 | Todd |
| 5,471,194 A | 11/1995 | Guscott |
| 5,486,812 A | 1/1996 | Todd |
| 5,499,014 A | 3/1996 | Greenwaldt |
| 5,499,196 A | 3/1996 | Pacheco |
| 5,519,878 A | 5/1996 | Dolin, Jr. |
| 5,578,989 A | 11/1996 | Pedtke |
| 5,579,197 A | 11/1996 | Mengelt et al. |
| D377,034 S | 12/1996 | Matsushita |
| 5,587,705 A | 12/1996 | Morris |
| 5,623,601 A | 4/1997 | Vu |
| 5,625,338 A | 4/1997 | Pildner et al. |
| 5,630,216 A | 5/1997 | McEwan |
| 5,651,070 A | 7/1997 | Blunt |
| D389,501 S | 1/1998 | Mascarenas, Sr. et al. |
| 5,715,394 A | 2/1998 | Jabs |
| 5,717,379 A | 2/1998 | Peters |
| 5,717,578 A | 2/1998 | Afzal |
| 5,731,756 A | 3/1998 | Roddy |
| 5,777,551 A | 7/1998 | Hess |
| 5,777,837 A * | 7/1998 | Eckel .................. H01H 47/007 307/125 |
| 5,874,952 A | 2/1999 | Morgan |
| 5,886,894 A | 3/1999 | Rakoff |
| 5,892,442 A | 4/1999 | Ozery |
| 5,907,279 A | 5/1999 | Bruins et al. |
| 5,909,183 A | 6/1999 | Borgstahl et al. |
| 5,914,655 A | 6/1999 | Clifton et al. |
| 5,943,394 A | 8/1999 | Ader et al. |
| 5,955,946 A | 9/1999 | Beheshti et al. |
| 5,958,053 A | 9/1999 | Denker |
| 5,959,528 A | 9/1999 | Right et al. |
| 5,963,916 A | 10/1999 | Kaplan |
| D416,910 S | 11/1999 | Vasquez |
| 5,991,795 A | 11/1999 | Howard et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Lee et al. |
| 6,049,273 A | 4/2000 | Hess |
| 6,052,052 A | 4/2000 | Delmonaco |
| 6,060,994 A | 5/2000 | Chen |
| 6,067,346 A | 5/2000 | Akhteruzzaman et al. |
| 6,067,440 A | 5/2000 | Diefes |
| 6,078,253 A | 6/2000 | Fowler |
| 6,078,257 A | 6/2000 | Ferraro |
| 6,085,030 A | 7/2000 | Whitehead et al. |
| 6,104,785 A | 8/2000 | Chen |
| 6,134,591 A | 10/2000 | Nickles |
| 6,138,249 A | 10/2000 | Nolet |
| 6,140,987 A | 10/2000 | Stein |
| 6,181,341 B1 | 1/2001 | Shinagawa |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 | 3/2001 | Agre et al. |
| 6,211,783 B1 | 4/2001 | Wang |
| 6,219,677 B1 | 4/2001 | Howard |
| 6,246,320 B1 | 6/2001 | Monroe |
| 6,271,752 B1 | 8/2001 | Vaios |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,295,346 B1 | 9/2001 | Markowitz et al. |
| 6,320,506 B1 | 11/2001 | Ferraro |
| D451,529 S | 12/2001 | Vasquez |
| 6,331,122 B1 | 12/2001 | Wu |
| 6,351,829 B1 | 2/2002 | Dupont et al. |
| 6,353,891 B1 | 3/2002 | Borella et al. |
| 6,363,417 B1 | 3/2002 | Howard et al. |
| 6,363,422 B1 | 3/2002 | Hunter et al. |
| 6,369,695 B1 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,385,772 B1 | 5/2002 | Courtney |
| 6,400,265 B1 | 6/2002 | Saylor et al. |
| D460,472 S | 7/2002 | Wang |
| 6,418,037 B1 | 7/2002 | Zhang |
| 6,433,683 B1 | 8/2002 | Robinson |
| D464,328 S | 10/2002 | Vasquez et al. |
| D464,948 S | 10/2002 | Vasquez et al. |
| 6,462,507 B2 | 10/2002 | Fisher et al. |
| 6,462,663 B1 | 10/2002 | Wilson et al. |
| 6,467,084 B1 | 10/2002 | Howard et al. |
| 6,480,901 B1 | 11/2002 | Weber et al. |
| 6,493,020 B1 | 12/2002 | Stevenson et al. |
| 6,496,927 B1 | 12/2002 | McGrane et al. |
| 6,529,723 B1 | 3/2003 | Bentley |
| 6,542,075 B2 | 4/2003 | Barker et al. |
| 6,553,336 B1 | 4/2003 | Johnson et al. |
| 6,563,800 B1 | 5/2003 | Salo et al. |
| 6,574,234 B1 | 6/2003 | Myer et al. |
| 6,580,950 B1 | 6/2003 | Johnson et al. |
| 6,587,455 B1 | 7/2003 | Ray et al. |
| 6,587,736 B2 | 7/2003 | Howard et al. |
| 6,591,094 B1 | 7/2003 | Bentley |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,615,088 B1 | 9/2003 | Myer et al. |
| 6,621,827 B1 | 9/2003 | Rezvani et al. |
| 6,624,750 B1 | 9/2003 | Marman et al. |
| 6,631,416 B2 | 10/2003 | Bendinelli et al. |
| 6,636,893 B1 | 10/2003 | Fong |
| 6,643,652 B2 | 11/2003 | Helgeson et al. |
| 6,643,669 B1 | 11/2003 | Novak et al. |
| 6,648,682 B1 | 11/2003 | Wu |
| 6,658,091 B1 | 12/2003 | Naidoo et al. |
| 6,661,340 B1 | 12/2003 | Saylor et al. |
| 6,686,838 B1 | 2/2004 | Rezvani et al. |
| 6,690,411 B2 | 2/2004 | Naidoo et al. |
| 6,693,530 B1 | 2/2004 | Dowens et al. |
| 6,693,545 B2 | 2/2004 | Brown et al. |
| 6,697,103 B1 | 2/2004 | Fernandez et al. |
| 6,704,786 B1 | 3/2004 | Gupta et al. |
| 6,721,689 B2 | 4/2004 | Markle et al. |
| 6,721,747 B2 | 4/2004 | Lipkin |
| 6,738,824 B1 | 5/2004 | Blair |
| 6,754,717 B1 | 6/2004 | Day, III et al. |
| 6,756,896 B2 | 6/2004 | Ford |
| 6,756,998 B1 | 6/2004 | Bilger |
| 6,762,686 B1 | 7/2004 | Tabe |
| 6,778,085 B2 | 8/2004 | Faulkner et al. |
| 6,781,509 B1 | 8/2004 | Oppedahl et al. |
| 6,785,542 B1 | 8/2004 | Blight et al. |

(56) References Cited

U.S. PATENT DOCUMENTS

| | | |
|---|---|---|
| 6,789,147 B1 | 9/2004 | Kessler et al. |
| 6,795,322 B2 | 9/2004 | Aihara et al. |
| 6,798,344 B2 | 9/2004 | Faulkner et al. |
| 6,810,409 B1 | 10/2004 | Fry et al. |
| 6,826,233 B1 | 11/2004 | Oosawa |
| 6,850,252 B1 | 2/2005 | Hoffberg |
| 6,856,236 B2 | 2/2005 | Christensen et al. |
| 6,865,690 B2 | 3/2005 | Kocin |
| 6,873,256 B2 | 3/2005 | Lemelson et al. |
| D504,889 S | 5/2005 | Andre et al. |
| 6,891,838 B1 | 5/2005 | Petite et al. |
| 6,912,429 B1 | 6/2005 | Bilger |
| 6,918,112 B2 | 7/2005 | Bourke-Dunphy et al. |
| 6,928,148 B2 | 8/2005 | Simon et al. |
| 6,930,599 B2 | 8/2005 | Naidoo et al. |
| 6,930,730 B2 | 8/2005 | Maxson et al. |
| 6,931,445 B2 | 8/2005 | Davis |
| 6,943,681 B2 | 9/2005 | Rezvani et al. |
| 6,956,477 B2 | 10/2005 | Chun |
| 6,959,341 B1 | 10/2005 | Leung |
| 6,959,393 B2 | 10/2005 | Hollis et al. |
| 6,963,981 B1 | 11/2005 | Bailey et al. |
| 6,965,313 B1 | 11/2005 | Saylor et al. |
| 6,970,183 B1 | 11/2005 | Monroe |
| 6,972,676 B1 | 12/2005 | Kimmel et al. |
| 6,975,220 B1 | 12/2005 | Foodman et al. |
| 6,977,485 B1 | 12/2005 | Wei |
| 6,990,591 B1 | 1/2006 | Pearson |
| 7,015,806 B2 | 3/2006 | Naidoo et al. |
| 7,016,970 B2 | 3/2006 | Harumoto et al. |
| 7,020,697 B1 | 3/2006 | Goodman et al. |
| 7,020,701 B1 | 3/2006 | Gelvin et al. |
| 7,024,676 B1 | 4/2006 | Klopfenstein |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,053,764 B2 | 5/2006 | Stilp |
| 7,072,934 B2 | 7/2006 | Helgeson et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,085,937 B1 | 8/2006 | Rezvani et al. |
| 7,099,944 B1 | 8/2006 | Anschutz et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,107,322 B1 | 9/2006 | Freeny, Jr. |
| 7,110,774 B1 | 9/2006 | Davis et al. |
| 7,113,090 B1 | 9/2006 | Saylor et al. |
| 7,113,099 B2 | 9/2006 | Tyroler et al. |
| 7,114,554 B2 | 10/2006 | Bergman et al. |
| 7,119,674 B2 | 10/2006 | Sefton |
| 7,120,232 B2 | 10/2006 | Naidoo et al. |
| 7,120,233 B2 | 10/2006 | Naidoo et al. |
| 7,130,383 B2 | 10/2006 | Naidoo et al. |
| 7,130,585 B1 | 10/2006 | Ollis et al. |
| 7,148,810 B2 | 12/2006 | Bhat |
| 7,149,798 B2 | 12/2006 | Rezvani et al. |
| 7,149,814 B2 | 12/2006 | Neufeld et al. |
| 7,164,907 B2 | 1/2007 | Cochran et al. |
| 7,166,987 B2 | 1/2007 | Lee et al. |
| 7,174,564 B1 | 2/2007 | Weatherspoon et al. |
| 7,183,907 B2 | 2/2007 | Simon et al. |
| 7,203,486 B2 | 4/2007 | Patel |
| 7,209,945 B2 | 4/2007 | Hicks et al. |
| 7,212,570 B2 | 5/2007 | Akiyama et al. |
| 7,218,217 B2 | 5/2007 | Adonailo et al. |
| 7,222,359 B2 | 5/2007 | Freund et al. |
| 7,237,267 B2 | 6/2007 | Rayes et al. |
| 7,248,161 B2 | 7/2007 | Spoltore et al. |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |
| 7,262,690 B2 | 8/2007 | Heaton et al. |
| 7,298,253 B2 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| D558,460 S | 1/2008 | Yu et al. |
| D558,756 S | 1/2008 | Andre et al. |
| 7,337,217 B2 | 2/2008 | Wang |
| 7,337,473 B2 | 2/2008 | Chang et al. |
| 7,343,619 B2 | 3/2008 | Ofek et al. |
| 7,349,761 B1 | 3/2008 | Cruse |
| 7,349,967 B2 | 3/2008 | Wang |
| 7,367,045 B2 | 4/2008 | Ofek et al. |
| 7,370,115 B2 | 5/2008 | Bae et al. |
| 7,383,339 B1 | 6/2008 | Meenan et al. |
| 7,403,838 B2 | 7/2008 | Deen et al. |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens, II et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,457,869 B2 | 11/2008 | Kernan |
| 7,469,139 B2 | 12/2008 | Van De Groenendaal |
| 7,469,294 B1 | 12/2008 | Luo et al. |
| 7,469,381 B2 | 12/2008 | Ording |
| D584,738 S | 1/2009 | Kim et al. |
| D585,399 S | 1/2009 | Hwang |
| 7,479,949 B2 | 1/2009 | Jobs et al. |
| 7,480,713 B2 | 1/2009 | Ullman |
| 7,480,724 B2 | 1/2009 | Zimler et al. |
| 7,498,695 B2 | 3/2009 | Gaudreau et al. |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,551,071 B2 | 6/2009 | Bennett, III |
| 7,554,934 B2 | 6/2009 | Abraham et al. |
| 7,558,379 B2 | 7/2009 | Winick |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,587,464 B2 | 9/2009 | Moorer et al. |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,651,530 B2 | 1/2010 | Winick |
| 7,653,911 B2 | 1/2010 | Doshi et al. |
| 7,681,201 B2 | 3/2010 | Dale et al. |
| 7,697,028 B1 | 4/2010 | Johnson |
| 7,701,970 B2 | 4/2010 | Krits et al. |
| D615,083 S | 5/2010 | Andre et al. |
| 7,711,796 B2 | 5/2010 | Gutt et al. |
| 7,734,020 B2 | 6/2010 | Elliot et al. |
| 7,734,286 B2 | 6/2010 | Almeda et al. |
| 7,734,906 B2 | 6/2010 | Orlando et al. |
| 7,739,596 B2 | 6/2010 | Clarke-Martin et al. |
| 7,751,409 B1 | 7/2010 | Carolan |
| 7,787,863 B2 | 8/2010 | Groenendaal et al. |
| D624,896 S | 10/2010 | Park et al. |
| D626,437 S | 11/2010 | Lee et al. |

(56) References Cited

U.S. PATENT DOCUMENTS

| | | |
|---|---|---|
| 7,827,252 B2 | 11/2010 | Hopmann et al. |
| 7,855,635 B2 | 12/2010 | Cohn et al. |
| 7,859,404 B2 | 12/2010 | Chul et al. |
| 7,882,537 B2 | 2/2011 | Okajo et al. |
| 7,884,855 B2 | 2/2011 | Ortiz |
| 7,890,612 B2 | 2/2011 | Todd et al. |
| 7,911,341 B2 | 3/2011 | Raji et al. |
| D636,769 S | 4/2011 | Wood et al. |
| 7,921,686 B2 | 4/2011 | Bagepalli et al. |
| D637,596 S | 5/2011 | Akana et al. |
| D639,805 S | 6/2011 | Song et al. |
| D640,663 S | 6/2011 | Arnholt et al. |
| 7,956,736 B2 | 6/2011 | Cohn et al. |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,042,049 B2 | 10/2011 | Killian et al. |
| 8,046,411 B2 | 10/2011 | Hayashi et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,159,519 B2 | 4/2012 | Kurtz et al. |
| 8,200,827 B1 | 6/2012 | Hunyady et al. |
| 8,209,400 B2 | 6/2012 | Baum et al. |
| D663,298 S | 7/2012 | Song et al. |
| D664,540 S | 7/2012 | Kim et al. |
| 8,214,496 B2 | 7/2012 | Gutt et al. |
| D664,954 S | 8/2012 | Kim et al. |
| D666,198 S | 8/2012 | Van Den Nieuwenhuizen et al. |
| 8,239,477 B2 | 8/2012 | Sharma et al. |
| D667,395 S | 9/2012 | Lee |
| D667,396 S | 9/2012 | Koh |
| D667,397 S | 9/2012 | Koh |
| D667,398 S | 9/2012 | Koh |
| D667,399 S | 9/2012 | Koh |
| 8,269,376 B1 * | 9/2012 | Elberbaum .............. H01H 9/167 307/115 |
| 8,269,623 B2 | 9/2012 | Addy et al. |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| D675,588 S | 2/2013 | Park |
| D675,612 S | 2/2013 | Andre et al. |
| D676,443 S | 2/2013 | Canizares et al. |
| D676,819 S | 2/2013 | Choi |
| 8,373,313 B2 * | 2/2013 | Garcia ................ H01H 23/145 307/141 |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| D679,706 S | 4/2013 | Tang et al. |
| D680,151 S | 4/2013 | Katori |
| D680,524 S | 4/2013 | Feng |
| D681,032 S | 4/2013 | Akana et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,473,619 B2 | 6/2013 | Baum et al. |
| D685,778 S | 7/2013 | Fahrendorff et al. |
| D685,783 S | 7/2013 | Bryan et al. |
| 8,478,844 B2 | 7/2013 | Baum et al. |
| 8,478,871 B2 | 7/2013 | Gutt et al. |
| 8,483,853 B1 | 7/2013 | Lambourne |
| 8,499,038 B1 | 7/2013 | Vucurevich |
| 8,520,068 B2 | 8/2013 | Naidoo et al. |
| 8,525,664 B2 | 9/2013 | Hadizad et al. |
| 8,543,665 B2 | 9/2013 | Ansari et al. |
| 8,584,199 B1 | 11/2013 | Chen et al. |
| 8,612,591 B2 | 12/2013 | Dawes et al. |
| 8,675,071 B1 | 3/2014 | Slavin et al. |
| 8,730,834 B2 | 5/2014 | Marusca et al. |
| 8,836,467 B1 | 9/2014 | Cohn et al. |
| 8,902,740 B2 | 12/2014 | Hicks, III |
| 8,914,526 B1 | 12/2014 | Lindquist et al. |
| 8,935,236 B2 | 1/2015 | Morita et al. |
| 2001/0016501 A1 | 8/2001 | King |
| 2001/0030597 A1 | 10/2001 | Inoue et al. |
| 2001/0034754 A1 | 10/2001 | Elwahab et al. |
| 2002/0004828 A1 | 1/2002 | Davis et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0029276 A1 | 3/2002 | Bendinelli et al. |
| 2002/0038380 A1 | 3/2002 | Brawn et al. |
| 2002/0052913 A1 | 5/2002 | Yamada et al. |
| 2002/0059637 A1 | 5/2002 | Rakib |
| 2002/0083342 A1 | 6/2002 | Webb et al. |
| 2002/0095490 A1 | 7/2002 | Barker et al. |
| 2002/0099809 A1 | 7/2002 | Lee |
| 2002/0099829 A1 | 7/2002 | Richards et al. |
| 2002/0103898 A1 | 8/2002 | Moyer et al. |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1 | 8/2002 | Graziano et al. |
| 2002/0112051 A1 | 8/2002 | Ullman |
| 2002/0112182 A1 | 8/2002 | Chang et al. |
| 2002/0114439 A1 | 8/2002 | Dunlap |
| 2002/0116117 A1 | 8/2002 | Martens et al. |
| 2002/0118107 A1 | 8/2002 | Yamamoto et al. |
| 2002/0120790 A1 | 8/2002 | Schwalb |
| 2002/0128728 A1 | 9/2002 | Murakami et al. |
| 2002/0133539 A1 | 9/2002 | Monday |
| 2002/0133578 A1 | 9/2002 | Wu |
| 2002/0143923 A1 | 10/2002 | Alexander |
| 2002/0147982 A1 | 10/2002 | Naidoo et al. |
| 2002/0156564 A1 | 10/2002 | Preston et al. |
| 2002/0163534 A1 | 11/2002 | Choi et al. |
| 2002/0163997 A1 | 11/2002 | Bergman et al. |
| 2002/0165006 A1 | 11/2002 | Haller et al. |
| 2002/0174367 A1 | 11/2002 | Kimmel et al. |
| 2002/0177428 A1 | 11/2002 | Menard et al. |
| 2002/0180579 A1 | 12/2002 | Nagaoka et al. |
| 2002/0184301 A1 | 12/2002 | Parent |
| 2003/0005030 A1 | 1/2003 | Sutton et al. |
| 2003/0009552 A1 | 1/2003 | Benfield et al. |

(56) References Cited

U.S. PATENT DOCUMENTS

| | | |
|---|---|---|
| 2003/0009553 A1 | 1/2003 | Benfield et al. |
| 2003/0023839 A1 | 1/2003 | Burkhardt et al. |
| 2003/0030548 A1 | 2/2003 | Kovacs et al. |
| 2003/0038849 A1 | 2/2003 | Craven et al. |
| 2003/0041137 A1 | 2/2003 | Horie et al. |
| 2003/0041167 A1 | 2/2003 | French et al. |
| 2003/0051009 A1 | 3/2003 | Shah et al. |
| 2003/0052923 A1 | 3/2003 | Porter |
| 2003/0061344 A1 | 3/2003 | Monroe |
| 2003/0062997 A1 | 4/2003 | Naidoo et al. |
| 2003/0065757 A1 | 4/2003 | Mentze et al. |
| 2003/0071724 A1 | 4/2003 | D'Amico |
| 2003/0090473 A1 | 5/2003 | Joshi |
| 2003/0103088 A1 | 6/2003 | Dresti et al. |
| 2003/0115345 A1 | 6/2003 | Chien et al. |
| 2003/0128115 A1 | 7/2003 | Giacopelli et al. |
| 2003/0132018 A1 | 7/2003 | Okita et al. |
| 2003/0137426 A1 | 7/2003 | Anthony et al. |
| 2003/0147534 A1 | 8/2003 | Ablay et al. |
| 2003/0158635 A1 | 8/2003 | Pillar et al. |
| 2003/0159135 A1 | 8/2003 | Hiller et al. |
| 2003/0174648 A1 | 9/2003 | Wang et al. |
| 2003/0177236 A1 | 9/2003 | Goto et al. |
| 2003/0182396 A1 | 9/2003 | Reich et al. |
| 2003/0187920 A1 | 10/2003 | Redkar |
| 2003/0189509 A1 | 10/2003 | Hayes et al. |
| 2003/0197847 A1 | 10/2003 | Shinoda |
| 2003/0200325 A1 | 10/2003 | Krishnaswamy et al. |
| 2003/0201889 A1 | 10/2003 | Zulkowski |
| 2003/0210126 A1 | 11/2003 | Kanazawa |
| 2003/0217136 A1 | 11/2003 | Cho et al. |
| 2003/0230934 A1 | 12/2003 | Cordelli et al. |
| 2003/0236841 A1 | 12/2003 | Epshteyn |
| 2004/0003241 A1 | 1/2004 | Sengodan et al. |
| 2004/0015572 A1 | 1/2004 | Kang |
| 2004/0024851 A1 | 2/2004 | Naidoo et al. |
| 2004/0037295 A1 | 2/2004 | Tanaka et al. |
| 2004/0054789 A1 | 3/2004 | Breh et al. |
| 2004/0086088 A1 | 5/2004 | Naidoo et al. |
| 2004/0086090 A1 | 5/2004 | Naidoo et al. |
| 2004/0086093 A1 | 5/2004 | Schranz |
| 2004/0103308 A1 | 5/2004 | Paller |
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0123149 A1 | 6/2004 | Tyroler |
| 2004/0139227 A1 | 7/2004 | Takeda |
| 2004/0143749 A1 | 7/2004 | Tajalli et al. |
| 2004/0155757 A1 | 8/2004 | Litwin et al. |
| 2004/0162902 A1 | 8/2004 | Davis |
| 2004/0163073 A1 | 8/2004 | Krzyzanowski et al. |
| 2004/0163118 A1 | 8/2004 | Mottur |
| 2004/0169288 A1 | 9/2004 | Hsieh et al. |
| 2004/0177163 A1 | 9/2004 | Casey et al. |
| 2004/0189460 A1 | 9/2004 | Heaton et al. |
| 2004/0189871 A1 | 9/2004 | Kurosawa et al. |
| 2004/0196844 A1 | 10/2004 | Hagino |
| 2004/0199645 A1 | 10/2004 | Rouhi |
| 2004/0202351 A1 | 10/2004 | Park et al. |
| 2004/0212503 A1 | 10/2004 | Stilp |
| 2004/0215694 A1 | 10/2004 | Podolsky |
| 2004/0215700 A1 | 10/2004 | Shenfield et al. |
| 2004/0223605 A1 | 11/2004 | Donnelly |
| 2004/0243835 A1 | 12/2004 | Terzis et al. |
| 2004/0243996 A1 | 12/2004 | Sheehy et al. |
| 2004/0246339 A1 | 12/2004 | Ooshima et al. |
| 2004/0249922 A1 | 12/2004 | Hackman et al. |
| 2004/0257433 A1 | 12/2004 | Lia et al. |
| 2004/0260407 A1 | 12/2004 | Wimsatt |
| 2004/0260427 A1 | 12/2004 | Wimsatt |
| 2004/0267937 A1 | 12/2004 | Klemets |
| 2005/0010866 A1 | 1/2005 | Humpleman et al. |
| 2005/0015805 A1 | 1/2005 | Iwamura |
| 2005/0023858 A1 | 2/2005 | Bingle et al. |
| 2005/0024203 A1 | 2/2005 | Wolfe |
| 2005/0038325 A1 | 2/2005 | Moll |
| 2005/0038326 A1 | 2/2005 | Mathur |
| 2005/0044061 A1 | 2/2005 | Klemow |
| 2005/0052831 A1 | 3/2005 | Chen |
| 2005/0060411 A1 | 3/2005 | Coulombe et al. |
| 2005/0066045 A1 | 3/2005 | Johnson et al. |
| 2005/0069098 A1 | 3/2005 | Kalervo et al. |
| 2005/0079855 A1 | 4/2005 | Jethi et al. |
| 2005/0086126 A1 | 4/2005 | Patterson |
| 2005/0086211 A1 | 4/2005 | Mayer |
| 2005/0091696 A1 | 4/2005 | Wolfe et al. |
| 2005/0096753 A1 | 5/2005 | Arling et al. |
| 2005/0102152 A1 | 5/2005 | Hodges |
| 2005/0108091 A1 | 5/2005 | Sotak et al. |
| 2005/0108369 A1 | 5/2005 | Sather et al. |
| 2005/0120082 A1 | 6/2005 | Hesselink et al. |
| 2005/0125083 A1 | 6/2005 | Kiko |
| 2005/0128068 A1 | 6/2005 | Winick et al. |
| 2005/0128083 A1 | 6/2005 | Puzio et al. |
| 2005/0144312 A1 | 6/2005 | Kadyk et al. |
| 2005/0149639 A1 | 7/2005 | Vrielink et al. |
| 2005/0149746 A1 | 7/2005 | Lu et al. |
| 2005/0156568 A1 | 7/2005 | Yueh |
| 2005/0159823 A1 | 7/2005 | Hayes et al. |
| 2005/0169288 A1 | 8/2005 | Kamiwada et al. |
| 2005/0184865 A1 | 8/2005 | Han et al. |
| 2005/0197847 A1 | 9/2005 | Smith |
| 2005/0200474 A1 | 9/2005 | Behnke |
| 2005/0204076 A1 | 9/2005 | Cumpson et al. |
| 2005/0210532 A1 | 9/2005 | Winick |
| 2005/0216302 A1 | 9/2005 | Raji et al. |
| 2005/0216580 A1 | 9/2005 | Raji et al. |
| 2005/0222820 A1 | 10/2005 | Chung et al. |
| 2005/0231349 A1 | 10/2005 | Bhat |
| 2005/0237182 A1 | 10/2005 | Wang |
| 2005/0249199 A1 | 11/2005 | Albert et al. |
| 2005/0256608 A1 | 11/2005 | King et al. |
| 2005/0267605 A1 | 12/2005 | Lee et al. |
| 2005/0273831 A1 | 12/2005 | Slomovich et al. |
| 2005/0276389 A1 | 12/2005 | Hinkson et al. |
| 2005/0280964 A1 | 12/2005 | Richmond et al. |
| 2006/0009863 A1 | 1/2006 | Lingemann |
| 2006/0010078 A1 | 1/2006 | Rezvani et al. |
| 2006/0018328 A1 | 1/2006 | Mody et al. |
| 2006/0045074 A1 | 3/2006 | Lee |
| 2006/0051122 A1 | 3/2006 | Kawazu et al. |
| 2006/0063534 A1 | 3/2006 | Kokkonen et al. |
| 2006/0064305 A1 | 3/2006 | Alonso |
| 2006/0064478 A1 | 3/2006 | Sirkin |
| 2006/0067344 A1 | 3/2006 | Sakurai |
| 2006/0067484 A1 | 3/2006 | Elliot et al. |
| 2006/0075235 A1 | 4/2006 | Renkis |
| 2006/0078344 A1 | 4/2006 | Kawazu et al. |
| 2006/0088092 A1 | 4/2006 | Chen et al. |
| 2006/0105713 A1 | 5/2006 | Zheng et al. |
| 2006/0109113 A1 | 5/2006 | Reyes et al. |
| 2006/0111095 A1 | 5/2006 | Weigand |
| 2006/0129837 A1 | 6/2006 | Im et al. |
| 2006/0132302 A1 | 6/2006 | Stilp |
| 2006/0142880 A1 | 6/2006 | Deen et al. |
| 2006/0142968 A1 | 6/2006 | Han et al. |
| 2006/0143268 A1 | 6/2006 | Chatani |
| 2006/0145842 A1 | 7/2006 | Stilp |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0168178 A1 | 7/2006 | Hwang et al. |
| 2006/0181406 A1 | 8/2006 | Petite et al. |
| 2006/0182100 A1 | 8/2006 | Li et al. |
| 2006/0187900 A1 | 8/2006 | Akbar |
| 2006/0190458 A1 | 8/2006 | Mishina et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0209857 A1 | 9/2006 | Hicks |
| 2006/0218593 A1 | 9/2006 | Afshary et al. |
| 2006/0220830 A1 | 10/2006 | Bennett, III |
| 2006/0222153 A1 | 10/2006 | Tarkoff et al. |

(56) References Cited

U.S. PATENT DOCUMENTS

| | | |
|---|---|---|
| 2006/0229746 A1 | 10/2006 | Ollis et al. |
| 2006/0230270 A1 | 10/2006 | Goffin |
| 2006/0242395 A1 | 10/2006 | Fausak |
| 2006/0245369 A1 | 11/2006 | Schimmelpfeng et al. |
| 2006/0246919 A1 | 11/2006 | Park et al. |
| 2006/0258342 A1 | 11/2006 | Fok et al. |
| 2006/0265489 A1 | 11/2006 | Moore |
| 2006/0271695 A1 | 11/2006 | Lavian |
| 2006/0282886 A1 | 12/2006 | Gaug |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0052675 A1 | 3/2007 | Chang |
| 2007/0055770 A1 | 3/2007 | Karmakar et al. |
| 2007/0061266 A1 | 3/2007 | Moore et al. |
| 2007/0063866 A1 | 3/2007 | Webb |
| 2007/0079151 A1 | 4/2007 | Connor et al. |
| 2007/0079385 A1 | 4/2007 | Williams et al. |
| 2007/0096981 A1 | 5/2007 | Abraham |
| 2007/0101345 A1 | 5/2007 | Takagi |
| 2007/0106124 A1 | 5/2007 | Kuriyama et al. |
| 2007/0130286 A1 | 6/2007 | Hopmann et al. |
| 2007/0142022 A1 | 6/2007 | Madonna et al. |
| 2007/0143440 A1 | 6/2007 | Reckamp et al. |
| 2007/0146484 A1 | 6/2007 | Horton et al. |
| 2007/0147419 A1 | 6/2007 | Tsujimoto et al. |
| 2007/0155325 A1 | 7/2007 | Bambic et al. |
| 2007/0162228 A1 | 7/2007 | Mitchell |
| 2007/0162680 A1 | 7/2007 | Mitchell et al. |
| 2007/0192486 A1 | 8/2007 | Wilson et al. |
| 2007/0198698 A1 | 8/2007 | Boyd et al. |
| 2007/0216783 A1 | 9/2007 | Ortiz et al. |
| 2007/0223465 A1 | 9/2007 | Wang et al. |
| 2007/0226182 A1 | 9/2007 | Sobotka et al. |
| 2007/0230415 A1 | 10/2007 | Malik |
| 2007/0245223 A1 | 10/2007 | Siedzik et al. |
| 2007/0256105 A1 | 11/2007 | Tabe |
| 2007/0265866 A1 | 11/2007 | Fehling et al. |
| 2007/0271398 A1 | 11/2007 | Manchester et al. |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0288849 A1 | 12/2007 | Moorer et al. |
| 2007/0298772 A1 | 12/2007 | Owens et al. |
| 2008/0001734 A1 | 1/2008 | Stilp et al. |
| 2008/0013957 A1 | 1/2008 | Akers et al. |
| 2008/0027587 A1 | 1/2008 | Nickerson et al. |
| 2008/0042826 A1 | 2/2008 | Hevia et al. |
| 2008/0048975 A1 | 2/2008 | Leibow |
| 2008/0065681 A1 | 3/2008 | Fontijn et al. |
| 2008/0072244 A1 | 3/2008 | Eker et al. |
| 2008/0084296 A1 | 4/2008 | Kutzik et al. |
| 2008/0091793 A1 | 4/2008 | Diroo et al. |
| 2008/0104516 A1 | 5/2008 | Lee |
| 2008/0109650 A1 | 5/2008 | Shim et al. |
| 2008/0112405 A1 | 5/2008 | Cholas et al. |
| 2008/0117029 A1 | 5/2008 | Dohrmann et al. |
| 2008/0126535 A1 | 5/2008 | Zhu et al. |
| 2008/0133725 A1 | 6/2008 | Shaouy |
| 2008/0141303 A1 | 6/2008 | Walker et al. |
| 2008/0141341 A1 | 6/2008 | Vinogradov et al. |
| 2008/0147834 A1 | 6/2008 | Quinn et al. |
| 2008/0163355 A1 | 7/2008 | Chu |
| 2008/0168404 A1 | 7/2008 | Ording |
| 2008/0170511 A1 | 7/2008 | Shorty et al. |
| 2008/0180240 A1 | 7/2008 | Raji et al. |
| 2008/0183842 A1 | 7/2008 | Raji et al. |
| 2008/0189609 A1 | 8/2008 | Larson et al. |
| 2008/0219239 A1 | 9/2008 | Bell et al. |
| 2008/0235326 A1 | 9/2008 | Parsi et al. |
| 2008/0235600 A1 | 9/2008 | Harper et al. |
| 2008/0240372 A1 | 10/2008 | Frenette |
| 2008/0253391 A1 | 10/2008 | Krits et al. |
| 2008/0261540 A1 | 10/2008 | Rohani et al. |
| 2008/0284587 A1 | 11/2008 | Saigh et al. |
| 2008/0316024 A1 | 12/2008 | Chantelou et al. |
| 2009/0019141 A1 | 1/2009 | Bush et al. |
| 2009/0036142 A1 | 2/2009 | Yan |
| 2009/0041467 A1 | 2/2009 | Carleton et al. |
| 2009/0042649 A1 | 2/2009 | Hsieh et al. |
| 2009/0049488 A1 | 2/2009 | Stransky |
| 2009/0063582 A1 | 3/2009 | Anna et al. |
| 2009/0066788 A1 | 3/2009 | Baum et al. |
| 2009/0066789 A1 | 3/2009 | Baum et al. |
| 2009/0067395 A1 | 3/2009 | Curtis et al. |
| 2009/0070436 A1 | 3/2009 | Dawes et al. |
| 2009/0070473 A1 | 3/2009 | Baum et al. |
| 2009/0070477 A1 | 3/2009 | Baum et al. |
| 2009/0070681 A1 | 3/2009 | Dawes et al. |
| 2009/0070682 A1 | 3/2009 | Dawes et al. |
| 2009/0070692 A1 | 3/2009 | Dawes et al. |
| 2009/0074184 A1 | 3/2009 | Baum et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |
| 2009/0100329 A1 | 4/2009 | Espinoza |
| 2009/0100492 A1 | 4/2009 | Hicks, III et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0134998 A1 | 5/2009 | Baum et al. |
| 2009/0138600 A1 | 5/2009 | Baum et al. |
| 2009/0138958 A1 | 5/2009 | Baum et al. |
| 2009/0146846 A1 | 6/2009 | Grossman |
| 2009/0158189 A1 | 6/2009 | Itani |
| 2009/0158292 A1 | 6/2009 | Rattner et al. |
| 2009/0165114 A1 | 6/2009 | Baum et al. |
| 2009/0177906 A1 | 7/2009 | Paniagua, Jr. et al. |
| 2009/0204693 A1 | 8/2009 | Andreev et al. |
| 2009/0221368 A1 | 9/2009 | Yen et al. |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0256708 A1 | 10/2009 | Hsiao et al. |
| 2009/0303100 A1 | 12/2009 | Zemany |
| 2009/0313693 A1 | 12/2009 | Rogers |
| 2009/0322510 A1 | 12/2009 | Berger et al. |
| 2010/0008274 A1 | 1/2010 | Kneckt et al. |
| 2010/0023865 A1 | 1/2010 | Fulker et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0052612 A1 | 3/2010 | Raji et al. |
| 2010/0066530 A1 | 3/2010 | Cohn et al. |
| 2010/0074112 A1 | 3/2010 | Derr et al. |
| 2010/0077111 A1 | 3/2010 | Holmes et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0121521 A1 | 5/2010 | Kiribayashi |
| 2010/0153853 A1 | 6/2010 | Dawes et al. |
| 2010/0159967 A1 | 6/2010 | Pounds et al. |
| 2010/0185857 A1 | 7/2010 | Neitzel et al. |
| 2010/0197219 A1 | 8/2010 | Issa et al. |
| 2010/0210240 A1 | 8/2010 | Mahaffey et al. |
| 2010/0212012 A1 | 8/2010 | Touboul et al. |
| 2010/0218104 A1 | 8/2010 | Lewis |
| 2010/0245107 A1 | 9/2010 | Fulker et al. |
| 2010/0267390 A1 | 10/2010 | Lin et al. |
| 2010/0280635 A1 | 11/2010 | Cohn et al. |
| 2010/0280637 A1 | 11/2010 | Cohn et al. |
| 2010/0298024 A1 | 11/2010 | Choi |
| 2010/0321151 A1 | 12/2010 | Matsuura et al. |
| 2010/0332164 A1 | 12/2010 | Aisa et al. |
| 2011/0000521 A1 | 1/2011 | Tachibana |
| 2011/0029875 A1 | 2/2011 | Milch |
| 2011/0040415 A1 | 2/2011 | Nickerson et al. |
| 2011/0040877 A1 | 2/2011 | Foisy |
| 2011/0096678 A1 | 4/2011 | Ketonen |
| 2011/0102588 A1 | 5/2011 | Trundle et al. |
| 2011/0197327 A1 | 8/2011 | McElroy et al. |

(56) References Cited

U.S. PATENT DOCUMENTS

| | | |
|---|---|---|
| 2011/0234392 A1 | 9/2011 | Cohn et al. |
| 2011/0283006 A1 | 11/2011 | Ramamurthy |
| 2012/0023151 A1 | 1/2012 | Bennett, III et al. |
| 2012/0066608 A1 | 3/2012 | Sundermeyer et al. |
| 2012/0081842 A1 | 4/2012 | Ewing et al. |
| 2012/0154138 A1 | 6/2012 | Cohn et al. |
| 2012/0182245 A1 | 7/2012 | Hutton |
| 2012/0242788 A1 | 9/2012 | Chuang et al. |
| 2012/0260184 A1 | 10/2012 | Dawes et al. |
| 2012/0278877 A1 | 11/2012 | Baum et al. |
| 2012/0327242 A1 | 12/2012 | Barley et al. |
| 2014/0143695 A1 | 5/2014 | Sundermeyer et al. |
| 2014/0143854 A1 | 5/2014 | Lopez et al. |
| 2014/0153695 A1 | 6/2014 | Yanagisawa et al. |
| 2015/0088982 A1 | 3/2015 | Johnson et al. |

FOREIGN PATENT DOCUMENTS

| | | |
|---|---|---|
| AU | 2010297957 | 5/2012 |
| AU | 2010297957 A1 | 5/2012 |
| AU | 2011250886 | 1/2013 |
| AU | 2011250886 A1 | 1/2013 |
| AU | 2011305163 | 5/2013 |
| AU | 2011305163 A1 | 5/2013 |
| CA | 2559842 | 9/2005 |
| CA | 2559842 C | 5/2014 |
| CN | 102834818 | 12/2012 |
| CN | 102985915 | 3/2013 |
| EP | 0295146 A2 | 12/1988 |
| EP | 0308046 A2 | 3/1989 |
| EP | 0591585 A1 | 4/1994 |
| EP | 0978111 B1 | 11/2001 |
| EP | 1738540 | 1/2007 |
| EP | 2112784 A1 | 10/2009 |
| FR | 2584217 A1 | 1/1987 |
| FR | 2661023 A1 | 10/1991 |
| FR | 2793334 A1 | 11/2000 |
| GB | 2222288 A | 2/1990 |
| GB | 2273593 A | 6/1994 |
| GB | 2319373 A | 5/1998 |
| GB | 2324630 A | 10/1998 |
| GB | 2335523 A | 9/1999 |
| GB | 2349293 A | 10/2000 |
| GB | 2370400 A | 6/2002 |
| GB | 2428821 | 2/2007 |
| GB | 2442628 | 4/2008 |
| GB | 2442633 | 4/2008 |
| GB | 2442640 | 4/2008 |
| JP | 8227491 A | 9/1996 |
| JP | 2002055895 A | 2/2002 |
| JP | 2003085258 A | 3/2003 |
| JP | 2003141659 A | 5/2003 |
| JP | 2004192659 A | 7/2004 |
| KR | 20060021605 A | 3/2006 |
| WO | WO-8907855 A1 | 8/1989 |
| WO | WO-9403881 A1 | 2/1994 |
| WO | WO-9636301 A1 | 11/1996 |
| WO | WO-9849663 A1 | 11/1998 |
| WO | WO-9934339 A2 | 7/1999 |
| WO | WO-0152478 A2 | 7/2001 |
| WO | WO-0199078 A2 | 12/2001 |
| WO | WO-0221300 A1 | 3/2002 |
| WO | WO-02097584 A2 | 12/2002 |
| WO | WO-03040839 A1 | 5/2003 |
| WO | WO-2004004222 A1 | 1/2004 |
| WO | WO-2004098127 A1 | 11/2004 |
| WO | WO-2004107710 A1 | 12/2004 |
| WO | WO-2005091218 A2 | 9/2005 |
| WO | WO-2005091218 A3 | 7/2006 |
| WO | WO-2007038872 A1 | 4/2007 |
| WO | WO-2007124453 A2 | 11/2007 |
| WO | WO-2009006670 A1 | 1/2009 |
| WO | WO-2009145747 A1 | 12/2009 |

OTHER PUBLICATIONS

Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Australian Patent App. No. 2010297957.
Australian Patent App. No. 2011250886.
Australian Patent App. No. 2011305163.
Canadian Patent App. No. 2559842.
Chinese Patent App. No. 201080053845.7.
Chinese Patent App. No. 201180034090.0.
Control Panel Standard—Features for False Alarm Reduction, The Security Industry Association, SIA 2009, pp. 1-48.
Co-pending U.S. Appl. No. 11/761,745, filed Jun. 12, 2007.
Co-pending U.S. Appl. No. 12/019,568, filed Jan. 24, 2008.
Co-pending U.S. Appl. No. 12/189,780, filed Aug. 11, 2008.
Co-pending U.S. Appl. No. 12/189,785, filed Aug. 11, 2008.
Co-pending U.S. Appl. No. 12/197,931, filed Aug. 25, 2008.
Co-pending U.S. Appl. No. 12/197,946, filed Aug. 25, 2008.
Co-pending U.S. Appl. No. 12/197,958, filed Aug. 25, 2008.
Co-pending U.S. Appl. No. 12/198,039, filed Aug. 25, 2008.
Co-pending U.S. Appl. No. 12/198,051, filed Aug. 25, 2008.
Co-pending U.S. Appl. No. 12/198,060, filed May 28, 2008.
Co-pending U.S. Appl. No. 12/198,066, filed Aug. 25, 2008.
Co-pending U.S. Appl. No. 12/269,735, filed Nov. 12, 2008.
Co-pending U.S. Appl. No. 12/539,537, filed Aug. 11, 2009.
Co-pending U.S. Appl. No. 12/568,718, filed Sep. 29, 2009.
Co-pending U.S. Appl. No. 12/630,092, filed Dec. 3, 2009.
Co-pending U.S. Appl. No. 12/691,992, filed Jan. 22, 2010.
Co-pending U.S. Appl. No. 12/718,385, filed Mar. 5, 2010.
Co-pending U.S. Appl. No. 12/732,879, filed Mar. 26, 2010.
Co-pending U.S. Appl. No. 12/750,470, filed Mar. 30, 2010.
Co-pending U.S. Appl. No. 12/770,253, filed Apr. 29, 2010.
Co-pending U.S. Appl. No. 12/770,365, filed Apr. 29, 2010.
Co-pending U.S. Appl. No. 12/771,071, filed Apr. 30, 2010.
Co-pending U.S. Appl. No. 12/771,372, filed Apr. 30, 2010.
Co-pending U.S. Appl. No. 12/771,471, filed Apr. 30, 2010.
Co-pending U.S. Appl. No. 12/771,624, filed Apr. 30, 2010.
Co-pending U.S. Appl. No. 12/892,303, filed Sep. 28, 2010.
Co-pending U.S. Appl. No. 12/892,801, filed Sep. 28, 2010.
Co-pending U.S. Appl. No. 12/952,080, filed Nov. 22, 2010.
Co-pending U.S. Appl. No. 12/970,313, filed Dec. 16, 2010.
Co-pending U.S. Appl. No. 12/971,282, filed Dec. 17, 2010.
Co-pending U.S. Appl. No. 12/972,740, filed Dec. 20, 2010.
Co-pending U.S. Appl. No. 13/099,293, filed May 2, 2011.
Co-pending U.S. Appl. No. 13/104,932, filed May 10, 2011.
Co-pending U.S. Appl. No. 13/104,936, filed May 10, 2011.
Co-pending U.S. Appl. No. 13/153,807, filed Jun. 6, 2011.
Co-pending U.S. Appl. No. 13/244,008, filed Sep. 23, 2011.
Co-pending U.S. Appl. No. 13/311,365, filed Dec. 5, 2011.
Co-pending U.S. Appl. No. 13/334,998, filed Dec. 22, 2011.
Co-pending U.S. Appl. No. 13/335,279, filed Dec. 22, 2011.
Co-pending U.S. Appl. No. 13/400,477, filed Dec. 22, 2011.
Co-pending U.S. Appl. No. 13/406,264, filed Feb. 27, 2012.
Co-pending U.S. Appl. No. 13/486,276, filed Jun. 1, 2012.
Co-pending U.S. Appl. No. 13/531,757, filed Jun. 25, 2012.
Co-pending U.S. Appl. No. 13/718,851, filed Dec. 18, 2012.
Co-pending U.S. Appl. No. 13/725,607, filed Dec. 21, 2012.
Co-pending U.S. Appl. No. 13/925,181, filed Jun. 24, 2013.
Co-pending U.S. Appl. No. 13/929,568, filed Jun. 27, 2013.
Co-pending U.S. Appl. No. 13/932,816, filed Jul. 1, 2013.
Co-pending U.S. Appl. No. 13/932,837, filed Jul. 1, 2013.
Co-pending U.S. Appl. No. 29/419,628, filed Apr. 30, 2012.
Co-pending U.S. Appl. No. 29/420,377, filed May 8, 2012.
European Patent App. No. 05725743.8.
European Patent App. No. 08797646.0.
European Patent App. No. 08828613.3.
European Patent App. No. 09807196.2.
European Patent App. No. 10819658.5.
European Patent App. No. 11781184.4.

(56) References Cited

OTHER PUBLICATIONS

European Patent App. No. 11827671.6.
Examination Report under Section 18(3) re for UK Patent Application No. GB0620362.4, dated Aug. 13, 2007.
Examination Report under Section 18(3) re for UK Patent Application No. GB0724248.0, dated Jun. 4, 2008.
Examination Report under Section 18(3) re for UK Patent Application No. GB0724248.0, dated Jan. 30, 2008.
Examination Report under Section 18(3) re for UK Patent Application No. GB0724760.4, dated Jan. 30, 2008.
Examination Report under Section 18(3) re for UK Patent Application No. GB0800040.8, dated Jan. 30, 2008.
Faultline, "AT&T Targets Video Home Security as Next Broadband Market," The Register, Nov. 2, 2006, 2 pages.
Final Office Action dated Aug. 1, 2011 for U.S. Appl. No. 12/630,092, filed Dec. 3, 2009.
Final Office Action dated Jun. 1, 2009 for U.S. Appl. No. 11/084,232, filed Mar. 16, 2005.
Final Office Action dated Jun. 5, 2012 for U.S. Appl. No. 12/771,071, filed Apr. 30, 2010.
Final Office Action dated May 9, 2013 for U.S. Appl. No. 12/189,780, filed Aug. 11, 2008.
Final Office Action dated May 9, 2013 for U.S. Appl. No. 12/952,080, filed Nov. 22, 2010.
Final Office Action dated Jan. 10, 2011 for U.S. Appl. No. 12/189,785, filed Aug. 11, 2008.
Final Office Action dated Jun. 10, 2011 for U.S. Appl. No. 11/084,232, filed Mar. 16, 2005.
Final Office Action dated Jul. 12, 2010 for U.S. Appl. No. 12/019,554, filed Jan. 24, 2008.
Final Office Action dated Jan. 13, 2011 for U.S. Appl. No. 12/189,780, filed Aug. 11, 2008.
Final Office Action dated Sep. 14, 2011 for U.S. Appl. No. 12/197,931, filed Aug. 25, 2008.
Final Office Action dated Feb. 16, 2011 for U.S. Appl. No. 12/019,568, filed Jan. 24, 2008.
Final Office Action dated Oct. 17, 2012 for U.S. Appl. No. 12/637,671, filed Dec. 14, 2009.
Final Office Action dated Sep. 17, 2012 for U.S. Appl. No. 12/197,958, filed Aug. 25, 2008.
Final Office Action dated Mar. 21, 2013 for U.S. Appl. No. 12/691,992, filed Jan. 22, 2010.
Final Office Action dated Jul. 23, 2013 for U.S. Appl. No. 13/531,757, filed Jun. 25, 2012.
Final Office Action dated Feb. 26, 2013 for U.S. Appl. No. 12/771,471, filed Apr. 30, 2010.
Final Office Action dated Jun. 29, 2012 for U.S. Appl. No. 12/539,537, filed Aug. 11, 2009.
Final Office Action dated Dec. 31, 2012 for U.S. Appl. No. 12/770,365, filed Apr. 29, 2010.
Final Office Action dated Oct. 31, 2012 for U.S. Appl. No. 12/771,624, filed Apr. 30, 2010.
Form PCT/ISA/210, "PCT International Search Report for the Application No. PCT/US05/08766," dated May 23, 2006, 2 pages.
Form PCT/ISA/210, "PCT International Search Report for the Application No. PCT/US08/72831," dated Nov. 4, 2008, 2 pages.
Form PCT/ISA/210, "PCT International Search Report for the Application No. PCT/US08/74246," dated Nov. 14, 2008, 2 pages.
Form PCT/ISA/210, "PCT International Search Report for the Application No. PCT/US08/74260," dated Nov. 13, 2008, 2 pages.
Form PCT/ISA/210, "PCT International Search Report for the Application No. PCT/US09/53485," dated Oct. 22, 2009, 2 pages.
Form PCT/ISA/210, "PCT International Search Report for the Application No. PCT/US09/55559," dated Nov. 12, 2009, 2 pages.
Form PCT/ISA/210, "PCT International Search Report for the Application No. PCT/US10/50585," dated Dec. 30, 2010, 2 pages.
Form PCT/ISA/210, "PCT International Search Report for the Application No. PCT/US10/57674," dated Mar. 2, 2011, 2 pages.
Form PCT/ISA/210, "PCT International Search Report for the Application No. PCT/US11/34858," dated Oct. 3, 2011, 2 pages.
Form PCT/ISA/210, "PCT International Search Report for the Application No. PCT/US11/35994," dated Sep. 28, 2011, 2 pages.
Form PCT/ISA/210, "PCT International Search Report for the Application No. PCT/US11/53136," dated Jan. 5, 2012, 2 pages.
Form PCT/ISA/210, "PCT International Search Report of the Application No. PCT/US08/83254," dated Jan. 14, 2009, 2 pages.
Form PCT/ISA/220, "PCT Notification of Transmittal of The International Search Report and the Written Opinion of the International Searching Authority, or the Declaration," 1 pg.
Form PCT/ISA/220, "PCT Notification of Transmittal of the International Search Report and the Written Opinion of the International Searching Authority, or the Declaration for the Application No. PCT/US05/08766," dated May 23, 2006, 1 pages.
Form PCT/ISA/220, "PCT Notification of Transmittal of the International Search Report and the Written Opinion of the International Searching Authority, or the Declaration for the Application No. PCT/US08/72831," dated Nov. 4, 2008, 1 page.
Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.
Form PCT/ISA/220, "PCT Notification of Transmittal of the International Search Report and the Written Opinion of the International Searching Authority, or the Declaration for the Application No. PCT/US08/74260," dated Nov. 13, 2008, 1 page.
Form PCT/ISA/220, "PCT Notification of Transmittal of the International Search Report and the Written Opinion of the International Searching Authority, or the Declaration for the Application No. PCT/US09/53485," dated Oct. 22, 2009, 1 page.
Form PCT/ISA/220, "PCT Notification of Transmittal of the International Search Report and the Written Opinion of the International Searching Authority, or the Declaration for the Application No. PCT/US09/55559," dated Nov. 12, 2009, 1 page.
Form PCT/ISA/220, "PCT Notification of Transmittal of the International Search Report and the Written Opinion of the International Searching Authority, or the Declaration for the Application No. PCT/US10/50585," dated Dec. 30, 2010, 1 page.
Form PCT/ISA/220, "PCT Notification of Transmittal of the International Search Report and the Written Opinion of the International Searching Authority, or the Declaration for the Application No. PCT/US10/57674," dated Mar. 2, 2011, 1 page.
Form PCT/ISA/220, "PCT Notification of Transmittal of the International Search Report and the Written Opinion of the International Searching Authority, or the Declaration for the Application No. PCT/US11/35994," dated Sep. 28. 2011, 1 page.
Form PCT/ISA/220, "PCT Notification of Transmittal of the International Search Report and the Written Opinion of the International Searching Authority, or the Declaration of the Application No. PCT/US08/83254," dated Jan. 14, 2009, 1 page.
Form PCT/ISA/237, "PCT Written Opinion ofthe International Searching Authority for the Application No. PCT/US05/08766," dated May 23, 2006, 5 pages.
Form PCT/ISA/237, "PCT Written Opinion of the International Searching Authority," 6 pgs.
Form PCT/ISA/237, "PCT Written Opinion of the International Searching Authority for the Application No. PCT/US08/72831," dated Nov. 4, 2008, 6 pages.
Form PCT/ISA/237, "PCT Written Opinion of the International Searching Authority for the Application No. PCT/US08/74246," dated Nov. 14, 2008, 6 pages.
Form PCT/ISA/237, "PCT Written Opinion of the International Searching Authority for the Application No. PCT/US08/74260," dated Nov. 13, 2008, 6 pages.
Form PCT/ISA/237, "PCT Written Opinion of the International Searching Authority for the Application No. PCT/US09/53485," dated Oct. 22, 2009, 8 pages.
Form PCT/ISA/237, "PCT Written Opinion of the International Searching Authority for the Application No. PCT/US09/55559," dated Nov. 12, 2009, 6 pages.
Form PCT/ISA/237, "PCT Written Opinion of the International Searching Authority for the Application No. PCT/US10/50585," Dec. 30, 2010, 7 pages.

(56) References Cited

OTHER PUBLICATIONS

Form PCT/ISA/237, "PCT Written Opinion of the International Searching Authority for the Application No. PCT/US10/57674," dated Mar. 2, 2011, 6 pages.
Form PCT/ISA/237, "PCT Written Opinion of the International Searching Authority for the Application No. PCT/US11/34858," dated Oct. 3, 2011, 8 pages.
Form PCT/ISA/237, "PCT Written Opinion of the International Searching Authority for the Application No. PCT/US11/35994," dated Sep. 28, 2011, 11 pages.
Form PCT/ISA/237, "PCT Written Opinion of the International Searching Authority for the Application No. PCT/US11/53136," dated Jan. 5, 2012.
Form PCT/ISA/237, "PCT Written Opinion ofthe International Searching Authority of the Application No. PCT/US08/83254," dated Jan. 14, 2009, 7 pages.
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012.
Indian Patent App. No. 3687/DELNP/2012.
International Patent Application No. PCT/US2013/048324.
International Search Report for Application No. PCT/US13/48324, dated Jan. 14, 2014, 2 pages.
International Search Report for Application No. PCT/US2014/050548, dated Mar. 18, 2015, 4 pages.
Lagotek Wireless Home Automation System, May 2006 [retrieved on Aug. 22, 2012].
Non-Final Office Action dated Apr. 4, 2013 for U.S. Appl. No. 12/197,931, filed Aug. 25, 2008.
Non-Final Office Action dated Mar. 4, 2013 for U.S. Appl. No. 13/400,477, filed Feb. 20, 2012.
Non-Final Office Action dated Jan. 5, 2010 for U.S. Appl. No. 12/019,554, filed Jan. 24, 2008.
Non-Final Office Action dated May 5, 2010 for U.S. Appl. No. 12/189,780, filed Aug. 11, 2008.
Non-Final Office Action dated May 5, 2010 for U.S. Appl. No. 12/189,785, filed Aug. 11, 2008.
Non-Final Office Action dated Feb. 7, 2012 for U.S. Appl. No. 12/637,671, filed Dec. 14, 2009.
Non-Final Office Action dated Feb. 7, 2013 for U.S. Appl. No. 12/970,313, filed Dec. 16, 2010.
Non-Final Office Action dated Feb. 8, 2012 for U.S. Appl. No. 12/630,092, filed Dec. 3, 2009.
Non-Final Office Action dated Apr. 9, 2012 for U.S. Appl. No. 12/771,624, filed Apr. 30, 2010.
Non-Final Office Action dated Dec. 9, 2008 for U.S. Appl. No. 11/084,232, filed Mar. 16, 2005.
Non-Final Office Action dated Aug. 10, 2012 for U.S. Appl. No. 12/771,471, filed Apr. 30, 2010.
Non-Final Office Action dated Oct. 11, 2012 for U.S. Appl. No. 12/019,568, filed Jan. 24, 2008.
Non-Final Office Action dated Apr. 12, 2012 for U.S. Appl. No. 12/770,365, filed Apr. 29, 2010.
Non-Final Office Action dated Jul. 12, 2012 for U.S. Appl. No. 12/691,992, filed Jan. 22, 2010.
Non-Final Office Action dated Oct. 12, 2012 for U.S. Appl. No. 12/630,092, filed Dec. 3, 2009.
Non-Final Office Action dated Sep. 12, 2012 for U.S. Appl. No. 12/952,080, filed Nov. 22, 2010.
Non-Final Office Action dated Apr. 13, 2010 for U.S. Appl. No. 11/761,745, filed Jun. 12, 2007.
Non-Final Office Action dated Jul. 13, 2010 for U.S. Appl. No. 12/019,568, filed Jan. 24, 2008.
Non-Final Office Action dated Nov. 14, 2012 for U.S. Appl. No. 13/531,757, filed Jun. 25, 2012.
Non-Final Office Action dated Sep. 14, 2010 for U.S. Appl. No. 11/084,232, filed Mar. 16, 2005.
Non-Final Office Action dated Sep. 16, 2011 for U.S. Appl. No. 12/539,537, filed Aug. 11, 2009.
Non-Final Office Action dated Sep. 17, 2012 for U.S. Appl. No. 12/189,780, filed Aug. 11, 2008.
Non-Final Office Action dated Aug. 18, 2011 for U.S. Appl. No. 12/197,958, filed Aug. 25, 2008.
Non-Final Office Action dated Feb. 18, 2011 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Feb. 21, 2013 for U.S. Appl. No. 12/771,372, filed Apr. 30, 2010.
Non-Final Office Action dated Jul. 21, 2010 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 22, 2013 for U.S. Appl. No. 12/630,092, filed Dec. 3, 2009.
Non-Final Office Action dated May 23, 2013 for U.S. Appl. No. 13/104,932, filed May 10, 2011.
Non-Final Office Action dated May 23, 2013 for U.S. Appl. No. 13/104,936, filed May 10, 2011.
Non-Final Office Action dated Jan. 26, 2012 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jun. 27, 2013 for U.S. Appl. No. 12/019,568, filed Jan. 24, 2008.
Non-Final Office Action dated Dec. 30, 2009 for U.S. Appl. No. 11/084,232, filed Mar. 16, 2005.
Non-Final Office Action dated May 30, 2008 for U.S. Appl. No. 11/084,232, filed Mar. 16, 2005.
Notice of Allowance dated May 14, 2013 for U.S. Appl. No. 12/637,671, filed Dec. 14, 2009.
Notice of Allowance dated Oct. 25, 2012 for U.S. Appl. No. 11/084,232, filed Mar. 16, 2005.
Requirement for Restriction/Election dated Jan. 22, 2013 for U.S. Appl. No. 13/104,932, filed May 10, 2011.
Requirement for Restriction/Election dated Jan. 22, 2013 for U.S. Appl. No. 13/104,936, filed May 10, 2011.
Requirement for Restriction/Election dated Oct. 24, 2012 for U.S. Appl. No. 12/750,470, filed Mar. 30, 2010.
Security for the Future, Introducing 5804BD—Advanced two-way wireless remote technology, Advertisement, ADEMCO Group, Syosset, NY, circa 1997.
South African Patent App. No. 2013/02668.
Supplemental European Search Report for Application No. EP05725743.8 dated Sep. 14, 2010, 2 pages.
Supplementary European Search Report for Application No. EP10819658, dated Mar. 10, 2015, 2 pages.
Supplementary European Search Report for Application No. EP11827671, dated Mar. 10, 2015, 2 pages.
Supplementary European Search Report for Application No. EP2191351, dated Jun. 23, 2014, 2 pages.
Supplementary Non-Final Office Action dated Oct. 28, 2010 for U.S. Appl. No. 12/630,092, filed Dec. 3, 2009.
Supplementary Partial European Search Report for Application No. EP09807196, dated Nov. 17, 2014, 5 pages.
Taiwanese Patent App. No. 99113848.
Taiwanese Patent App. No. 99113853.
Taiwanese Patent App. No. 99113855.
Taiwanese Patent App. No. 99113856.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United Kingdom Patent No. 2428821.
United Kingdom Patent No. 2442628.
United Kingdom Patent No. 2442633.
United Kingdom Patent No. 2442640.
Wireless, Battery-Powered Smoke Detectors, Brochure, SafeNight Technology, Inc. Roanoke, VA, 1995.

(56) References Cited

OTHER PUBLICATIONS

WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.
Co-pending U.S. Appl. No. 12/197,946, filed Aug. 25, 2008, U.S. Pat. No. 8,612,591, Dec. 17, 2013, Dawes et al.
Co-pending U.S. Appl. No. 11/761,745, filed Jun. 12, 2007, U.S. Pat. No. 8,635,350, Jan. 21, 2014, Gutt et al.
Co-pending U.S. Appl. No. 12/770,253, filed Apr. 29, 2010, U.S. Pat. No. 8,635,499, Jan. 21, 2014, Cohn et al.
Co-pending U.S. Appl. No. 12/568,718, filed Sep. 29, 2009, U.S. Pat. No. 8,638,211 Jan. 28, 2014 Cohn et al.
Co-pending U.S. Appl. No. 12/198,051, filed Aug. 25, 2008, U.S. Pat. No. 8,713,132, Apr. 29, 2014, Baum et al.
Co-pending U.S. Appl. No. 12/198,039, filed Aug. 25, 2008, U.S. Pat. No. 8,819,178, Aug. 26, 2014, Baum et al.
Co-pending U.S. Appl. No. 12/198,060, filed May, 28, 2008, U.S. Pat. No. 8,825,871, Sep. 2, 2014, Baum et al.
Co-pending U.S. Appl. No. 12/892,303, filed Sep. 28, 2010, U.S. Pat. No. 8,836,467, Sep. 16, 2014, Cohn et al.
Co-pending U.S. Appl. No. 13/244,008, filed Sep. 23, 2011, U.S. Pat. No. 8,963,713, Feb. 24, 2015, Dawes et al.
Co-pending U.S. Appl. No. 12/892,801, filed Sep. 28, 2010, U.S. Pat. No. 8,988,221, Mar. 24, 2015, Raji et al.
Co-pending U.S. Appl. No. 12/269,735, filed Nov. 12, 2008, U.S. Pat. No. 8,996,665, Mar. 31, 2015, Baum et al.
Co-pending U.S. Appl. No. 12/718,385, filed Mar. 5, 2010, U.S. Pat. No. 9,047,753, Jun. 2, 2015, Dawes et al.
Co-pending U.S. Appl. No. 12/198,066, filed Aug. 25, 2008, U.S. Pat. No. 9,059,863, Jun. 16, 2015, Baum et al.
Co-pending U.S. Appl. No. 12/770,365, filed Apr. 29, 2010, U.S. Pat. No. 9,100,446, Aug. 4, 2015, Cohn et al.
Co-pending U.S. Appl. No. 13/311,365, filed Dec. 5, 2011, U.S. Pat. No. 9,141,276, Sep. 22, 2015, Dawes et al.
Co-pending U.S. Appl. No. 13/099,293, filed May 2, 2011, U.S. Pat. No. 9,144,143, Sep. 22, 2015, Raji et al.
Co-pending U.S. Appl. No. 12/971,282, filed Dec. 17, 2010, U.S. Pat. No. 9,147,337, Sep. 29, 2015, Cohn et al.
Co-pending U.S. Appl. No. 12/197,931, filed Aug. 25, 2008, U.S. Pat. No. 9,172,553, Oct. 27, 2015, Dawes et al.
Co-pending U.S. Appl. No. 12/750,470, filed Mar. 30, 2010, U.S. Pat. No. 9,191,228, Nov. 17, 2015, Fulker et al.
Co-pending U.S. Appl. No. 12/732,879, filed Mar. 26, 2010, U.S. Pat. No. 9,412,248, Aug. 9, 2016, Cohn et al.
Co-pending U.S. Appl. No. 12/771,471, filed Apr. 30, 2010, U.S. Pat. No. 9,426,720, Aug. 23, 2016, Cohn et al.
Co-pending U.S. Appl. No. 12/189,785, filed Aug. 11, 2008, U.S. Pat. No. 9,450,776, Sep. 20, 2016, Baum et al.
Co-pending U.S. Appl. No. 13/725,607, filed Dec. 21, 2012, U.S. Pat. No. 9,510,065, Nov. 29, 2016, Cohn et al.
Co-pending U.S. Appl. No. 13/334,998, filed Dec. 22, 2011, U.S. Pat. No. 9,621,408, Apr. 11, 2017, Gutt et al.
Co-pending U.S. Appl. No. 13/932,837, filed Jul. 1, 2013, U.S. Pat. No. 9,621,408, Apr. 11, 2017, Gutt et al.
Co-pending U.S. Appl. No. 12/972,740, filed Dec. 17, 2010, U.S. Pat. No. 9,729,342, Aug. 8, 2017, Cohn et al.
Co-pending U.S. Appl. No. 29/419,628, filed Apr. 30, 2012, D692042, Oct. 22, 2013, Dawes et al.
Co-pending U.S. Appl. No. 29/420,377, filed May 8, 2012, D695735, Dec. 17, 2013, Kitchen et al.
Co-pending U.S. Appl. No. 12/019,568, filed Jan. 24, 2008, 2008/0183842, Jul. 31, 2008, Raji et al.
Co-pending U.S. Appl. No. 12/197,958, filed Aug. 25, 2008, 2009/0070692, Mar. 12, 2009, Dawes et al.
Co-pending U.S. Appl. No. 12/189,780, filed Aug. 11, 2008, 2009/0077623, Mar. 19, 2009, Baum et al.
Co-pending U.S. Appl. No. 12/539,537, filed Aug. 11, 2009, 2010/0023865, Jan. 28, 2010, Fulker et al.
Co-pending U.S. Appl. No. 12/630,092, filed Dec. 3, 2009, 2010/0082744, Apr. 1, 2010, Raji et al.
Co-pending U.S. Appl. No. 12/691,992, filed Jan. 22, 2010, 2010/0277302, Nov. 4, 2010, Cohn et al.
Co-pending U.S. Appl. No. 12/771,372, filed Apr. 30, 2010, 2010/0280637, Nov. 4, 2010, Cohn et al.
Co-pending U.S. Appl. No. 12/771,071, filed Apr. 30, 2010, 2010/0281135, Nov. 4, 2010, Cohn et al.
Co-pending U.S. Appl. No. 12/771,624, filed Apr. 30, 2010, 2010/0281161, Nov. 4, 2010, Cohn et al.
Co-pending U.S. Appl. No. 12/952,080, filed Nov. 22, 2010, 2011/0128378, Jun. 2, 2011, Raji.
Co-pending U.S. Appl. No. 13/153,807, filed Jun. 6, 2011, 2011/0234392, Sep. 29, 2011, Cohn et al.
Co-pending U.S. Appl. No. 13/104,932, filed May 10, 2011, 2012/0066608, Mar. 15, 2012, Sundermeyer et al.
Co-pending U.S. Appl. No. 13/104,936, filed Jun. 6, 2011, 2012/0066632, Mar. 15, 2012, Sundermeyer et al.
Co-pending U.S. Appl. No. 12/970,313, filed Dec. 16, 2010, 2012/0154126, Jun. 21, 2012, Cohn et al.
Co-pending U.S. Appl. No. 13/335,279, filed Dec. 22, 2011, 2012/0278877, Nov. 1, 2012, Baum et al.
Co-pending U.S. Appl. No. 13/400,477, filed Dec. 22, 2011, 2012/0324566, Dec. 20, 2012, Baum et al.
Co-pending U.S. Appl. No. 13/531,757, filed Jun. 25, 2012, 2012/0331109, Dec. 27, 2012, Baum et al.
Co-pending U.S. Appl. No. 13/406,264, filed Feb. 27, 2012, 2013/0062951, Mar. 14, 2013, Raji et al.
Co-pending U.S. Appl. No. 13/718,851, filed Dec. 18, 2012, 2013/0318231, Nov. 28, 2013, Raji et al.
Co-pending U.S. Appl. No. 13/929,568, filed Jun. 27, 2013, 2014/0143695, May 22, 2014, Sundermeyer et al.
Co-pending U.S. Appl. No. 13/932,816, filed Jul. 1, 2013, 2014/0143851, May 22, 2014, Baum et al.
Co-pending U.S. Appl. No. 13/925,181, filed Jun. 24, 2013, 2014/0172957, Jun. 19, 2014, Baum et al.
International Patent Application No. PCT/US2013/048324, WO 2014004911, Jan, 3, 2014, iControl Networks Inc.

\* cited by examiner

| Activity | Detection Mechanism | | Action |
|---|---|---|---|
| | Load Current | Red/Black Travellers | |
| Other switch toggled (turned on) | 0 to >0 | | Send ZigBee [current] and [light on] status |
| Other switch toggled (turned off) | >0 to 0 | | Send ZigBee [no current] and [light off] status |
| ZigBee switch manually toggled (turned on) | 0 to >0 | Detect this switch toggle | Send ZigBee [current] and [light on] status |
| ZigBee switch manually toggled (turned off) | >0 to 0 | Detect this switch toggle | Send ZigBee [no current] and [light off] status |
| ZigBee command to turn [light on] | If >0 | | No switch change but send [current] and [light on] status |
| ZigBee command to turn [light on] | If 0 | | Toggle switch and send [current] and [light on] status |
| ZigBee command to turn [light off] | If >0 | | Toggle switch and send [no current] and [light off] status |
| ZigBee command to turn [light off] | If 0 | | No switch change but send [no current] and [light off] status |
| Detect bad light bulb | When ZigBee toggles switch and current stays at 0 | | Send [no current] and [bad light] status |

Figure 3

THREE-WAY SWITCH

RELATED APPLICATION

This application claims the benefit of U.S. Patent Application No. 61/784,342, filed Mar. 14, 2013.

TECHNICAL FIELD

Embodiments described herein relate generally to systems and methods for power switches.

BACKGROUND

In building wiring, multiway switching is the interconnection of two or more electrical switches to control an electrical load (often, but not always, lighting) from more than one location. For example, this allows lighting in a hallway, stairwell, or large room to be controlled from multiple locations. While a "normal" light switch needs to be only a Single Pole, Single Throw (SPST) switch, multiway switching requires the use of switches that have one or more additional contacts and two or more wires must be run between the switches. When the load is controlled from only two points, Single Pole, Double Throw (SPDT) switches are used. One example of a multiway switch is a three-way switch. Electrically, a three-way switch is a Single-Pole, Double-Throw (SPDT) switch. By correctly connecting two of these switches together, toggling either switch changes the state of the load from off to on, or on to off. The switches may be arranged so that they are in the same orientation for off, and contrasting orientations for on.

FIG. 4 is a block diagram of a conventional three-way switch. Conventional implementations of a three-way switch require all switches to be replaced in case of a device failure. In addition, it requires the installer to know which end is the load versus the supply (slave or master). With the advent of home automation, it would be beneficial to have more capable three-way switches.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE FIGURES

FIG. 3 is a state table of the RF three-way switch, under an embodiment.

DETAILED DESCRIPTION

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Generally, devices and methods described herein comprise a relay coupled between conductors and rectifier circuits. A converter is coupled between the rectifier circuits and a radio frequency (RF) device. Control signals are coupled to the RF device. A physical switch is coupled to the RF device, and the control outputs of the physical switch form a multi-way switch.

Figure 1:
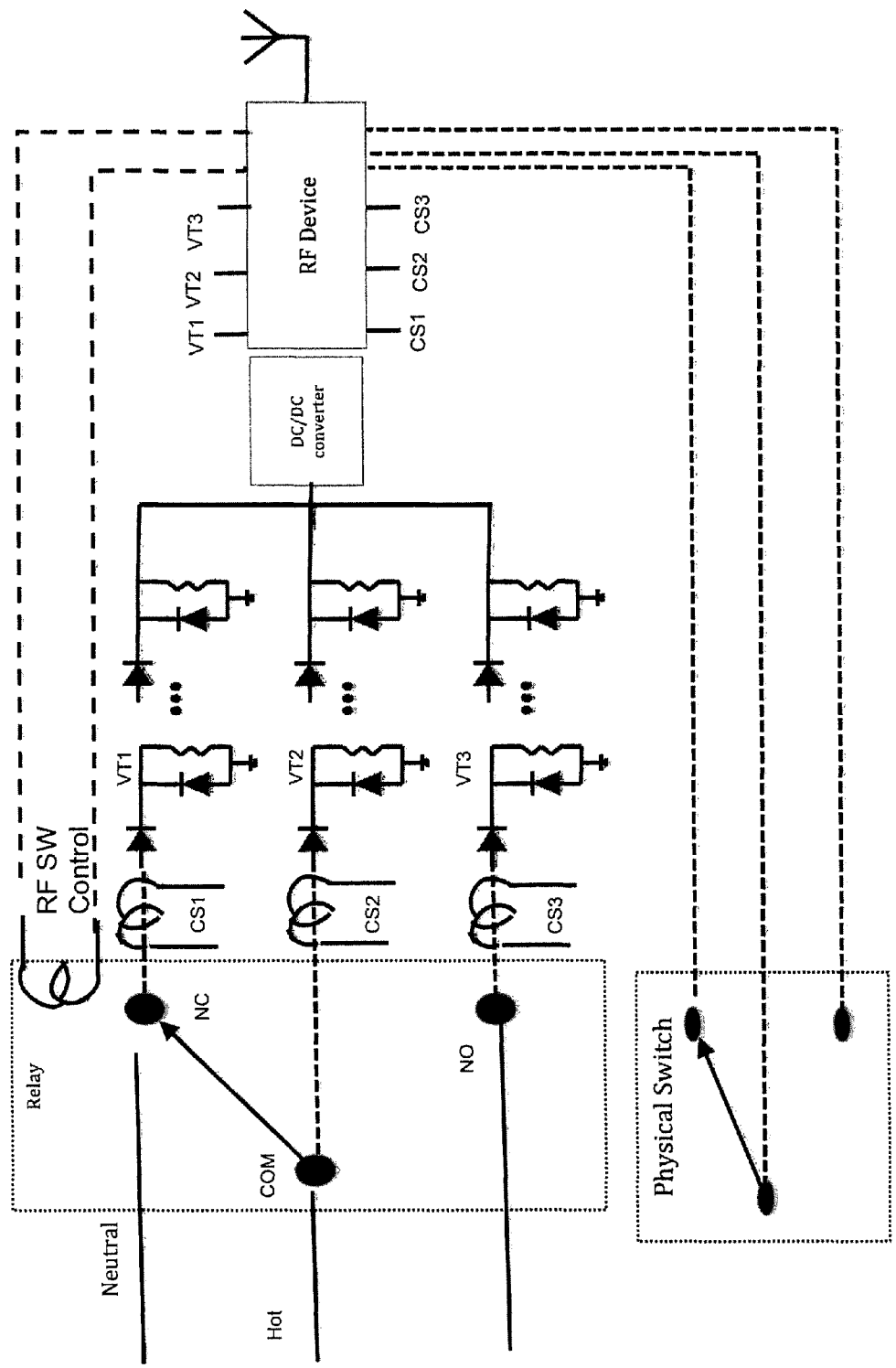
FIG. 1 is a block diagram of a RF-based three-way switch, under an embodiment.

FIG. 1 is a block diagram of a RF-based three-way switch, under an embodiment. The switch of an embodiment comprises a physical switch coupled or connected to an RF device or processor. The RF device is coupled or connected to a converter, which in an embodiment comprises a DC-to-DC converter. The converter is coupled or connected to the local power supply by a relay circuit and numerous rectifier circuits.

The switch of an embodiment simplifies the installation process involving three-way switches by only having to replace one of the three-way switches in a multi-switch installation. Furthermore, the switch of an embodiment is positionally agnostic in that it can function as either the master or the slave (supply or load). In addition the switch is Radio Frequency (RF) controlled (e.g., Zigbee, WiFi, etc.), and is configured to report the status or state of the light (i.e. on or off) as well as the current power consumption.

Figure 2:
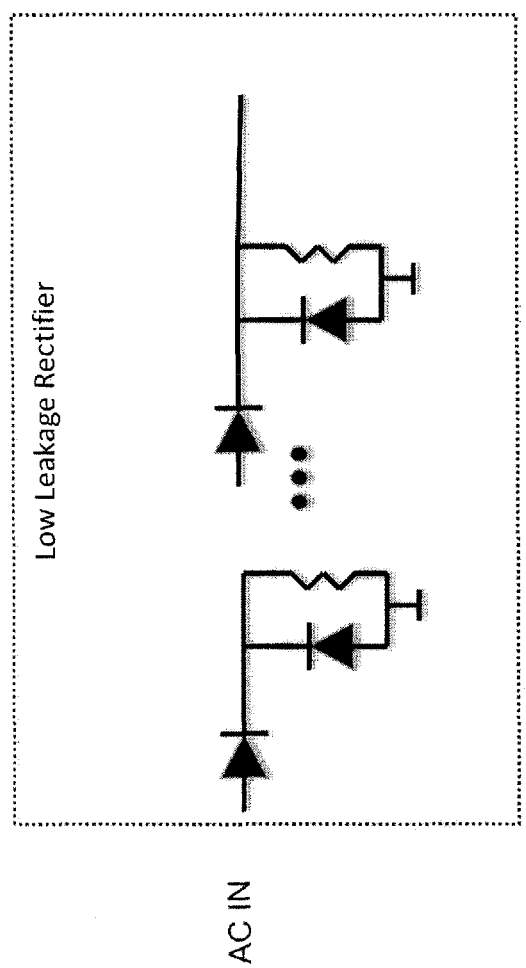
FIG. 2 is a block diagram of a low-leakage rectifier, under an embodiment.
Figure 4:
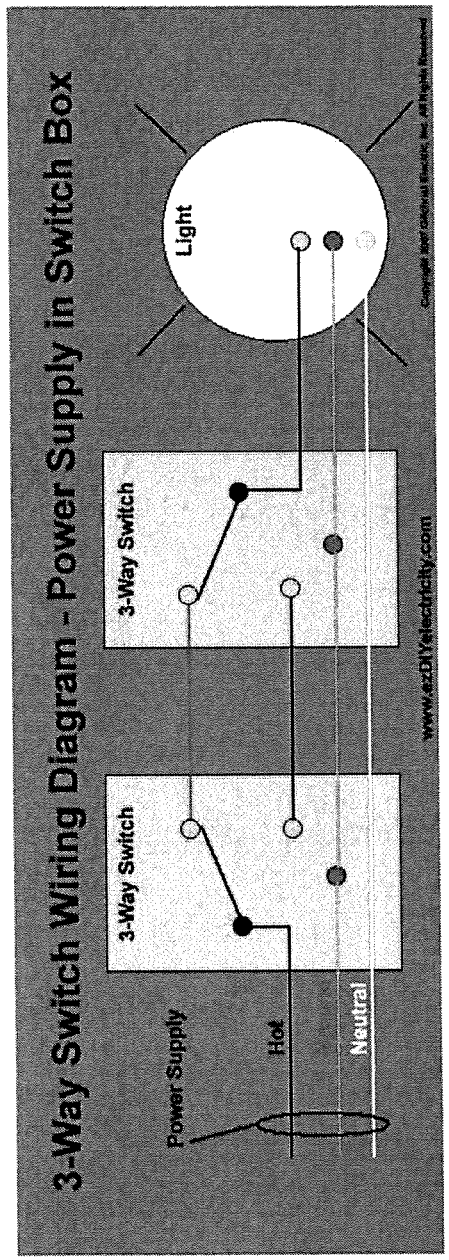
FIG. 4 is a block diagram of a conventional three-way switch.

FIG. 2 is a block diagram of a rectifier circuit, under an embodiment. Each rectifier circuit of an embodiment is a low-leakage rectifier, but the embodiment is not so limited. Power to the RF switch of an embodiment is provided by the combination of the rectifier circuits and the converter. Each rectifier circuit of an embodiment includes a combination of low-leakage diodes. An optional shunt resistor is included in an embodiment to clamp reverse leakage current to direct current (DC) ground. Multiple instances of the circuit are implemented in an embodiment to reduce the reverse leakage current of any particular diode to relatively smaller magnitudes.

The local power supply to the switch is an alternating current (AC) system comprising three circuit conductors. The local power supply therefore includes a first conductor that is a "hot" conductor carrying an electric potential relative to electrical ground or neutral, a second conductor that is a neutral return conductor of the local power supply circuit, and a ground conductor with continuity to earth ground. In an embodiment, each conductor of the local power supply is coupled or connected to the converter using a dedicated rectifier circuit, but the embodiment is not so limited.

As described herein the switch of an embodiment includes at least three instances of the rectifier circuit, one coupled or connected to each of the relay three-way switch connections, i.e. one to the normally closed (NC) contact, one to the common (C), and one to the normally open (NO) contact. The physical conductors of the local power supply are connected to the RF-enabled three-way switch at each of the relay inputs, i.e. NC, C, and NO contacts, instead of the physical switch. The physical switch comprises a low-voltage contact to the RF device that acts as an input to the RF device to indicate user input.

The RF device comprises a processor and is coupled to numerous control signals. In an embodiment, the RF device is coupled to signals VT1-VT3, CS1-CS3, relay enable signals, and physical switch contacts NC, NO, COM. The VT1-VT3 signals act as voltage sensors to determine whether or not line voltage is present at each of the AC terminals. The CS1-CS3 signals are current sensors, which could be implemented at current transformers, hall effect devices, or other such means as measuring current.

In operation, the device is indicated to be "ON" when current sensor CS1 and CS3 or CS1 and CS2 indicate current flowing. If a user activates or presses the physical switch, then the RF device reads the input, and contacts the relay accordingly. If an RF command is indicated to turn off or turn on the device, then the RF device contacts the relay accordingly. FIG. 3 is a state table of the RF three-way switch, under an embodiment.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments and corresponding systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the embodiments and corresponding systems and methods in light of the above detailed description.

In general, in the following claims, the teens used should not be construed to limit the invention and corresponding systems and methods to the specific embodiments disclosed in the specification and the claims, but should be construed to include all systems that operate under the claims. Accordingly, the invention and corresponding systems and methods is not limited by the disclosure, but instead the scope is to be determined entirely by the claims.

While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods described herein.

What is claimed is:

1. A device comprising:
   a relay configured to control electrical communication, via at least one contact of a plurality of contacts of the relay, between a plurality of conductors and a plurality of rectifier circuits, wherein a toggle state of the relay is indicative of an electrical configuration between the plurality of conductors and the plurality of rectifier circuits;
   a manual switch configured to receive a user input associated with a toggle state of the manual switch, wherein the toggle state of the manual switch is indicative of a command to modify the toggle state of the relay; and
   a radio frequency (RF) device in communication with the relay and the manual switch, wherein the RF device is configured to communicate, via an RF signal, with one or more external devices, and wherein the RF device is configured to:
      receive one or more of a manual switch signal indicative of the toggle state of the manual switch or an RF control signal indicative of a command to modify the toggle state of the relay,
      cause, based on the one or more of the manual switch signal or the RF control signal, a modification to the toggle state of the relay, and
      cause output of an RF status signal indicative of the modification to the toggle state of the relay.

2. The device of claim 1, wherein the relay comprises a single-pole, triple-throw switch relay.

3. The device of claim 1, wherein the relay is configured to control a power supply to an electrical device by controlling the electrical communication between the plurality of conductors and the plurality of rectifier circuits.

4. The device of claim 1, wherein the plurality of conductors comprises a hot conductor, a neutral return conductor, and a ground conductor.

5. The device of claim 1, further comprising a plurality of voltage sensors in communication with the plurality of rectifier circuits,
   wherein the radio frequency (RF) device is configured to cause the modification to the toggle state of the relay further based on data from at least one of the plurality of voltage sensors.

6. The device of claim 1, further comprising a direct current to direct current (DC-DC) converter in electrical communication with the radio frequency (RF) device.

7. The device of claim 1, further comprising a plurality of current sensors in communication with the plurality of rectifier circuits,
   wherein the radio frequency (RF) device is configured to cause the modification to the toggle state of the relay further based on data from at least one of the plurality of current sensors.

8. The device of claim 1, wherein the relay comprises a single pole and at least double-throw switch relay.

9. A method comprising:
   receiving, by a radio frequency (RF) device, a manual switch signal indicative of a toggle state of a manual switch or an RF control signal indicative of a command to modify a toggle state of a relay,
      wherein the toggle state of the manual switch is indicative of another command to modify the toggle state of the relay, and
      wherein the toggle state of the relay is indicative of an electrical configuration, controlled by the relay, between a plurality of conductors and a plurality of rectifier circuits in electrical communication via at least one contact of a plurality of contacts of the relay;
   causing, based on the one or more of the manual switch signal or the RF control signal, a modification to the toggle state of the relay; and
   causing output of an RF status signal indicative of the modification to the toggle state of the relay.

10. The method of claim 9, wherein the causing the modification to the toggle state of the relay comprises sending, to the relay, a command signal indicative of the modification to the toggle state of the relay.

11. The method of claim 9, wherein the receiving the radio frequency (RF) control signal indicative of the command to modify the toggle state of the relay comprises receiving the RF control signal from an external device.

12. The method of claim 11, wherein the causing the output of the radio frequency (RF) status signal comprises sending, to the external device, the RF status signal.

13. The method of claim 9, wherein the causing the modification to the toggle state of the relay comprises modifying an electrical load supplied to an electric device.

14. The method of claim 13, wherein the electric device comprises a lighting device.

15. The method of claim 13, wherein the causing the output of the radio frequency (RF) status signal comprises sending the RF status signal via at least one of a wireless communication or an RF communication.

16. The method of claim 9, further comprising causing output of a second radio frequency (RF) status signal indicative of power consumption associated with the relay.

17. A device comprising:
one or more processors; and
memory storing instructions that, when executed by the one or more processors, cause the device to:
receive a manual switch signal indicative of a toggle state of a manual switch or an RF control signal indicative of a command to modify a toggle state of a relay,
wherein the toggle state of the manual switch is indicative of another command to modify the toggle state of the relay, and
wherein the toggle state of the relay is indicative of an electrical configuration, controlled by the relay, between a plurality of conductors and a plurality of rectifier circuits in electrical communication, via at least one contact of a plurality of contacts of the relay, with the relay;
cause, based on the one or more of the manual switch signal or the RF control signal, a modification to the toggle state of the relay; and
cause output of an RF status signal indicative of the modification to the toggle state of the relay.

18. The device of claim 17, wherein the manual switch comprises at least one of a plurality of control interfaces installed at a premises.

19. The device of claim 17, wherein the instructions, when executed by the one or more processors, further cause the device to cause output of a second radio frequency (RF) status signal indicative of power consumption associated with the relay.

20. The device of claim 17, wherein the toggle state of the manual switch is further indicative of a command to modify an electrical load supplied to an electrical device.

* * * * *